Nov. 13, 1962  T. K. PHELAN  3,063,929
ELECTRICAL CONTROL DEVICE FOR ELECTROLYTIC CELLS
Filed Feb. 6, 1959  2 Sheets-Sheet 1
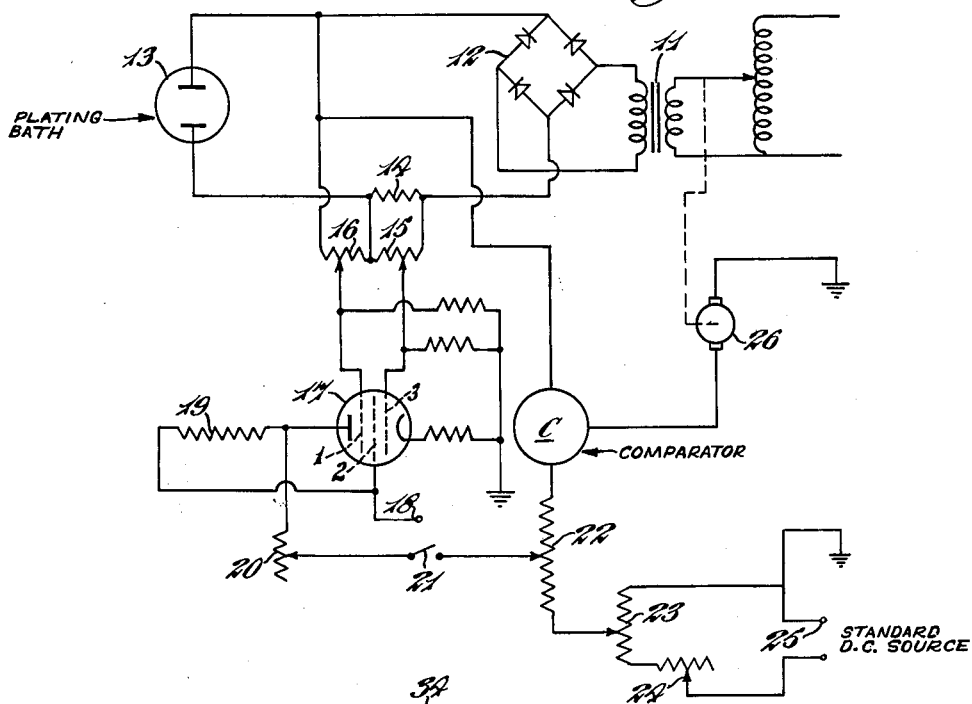
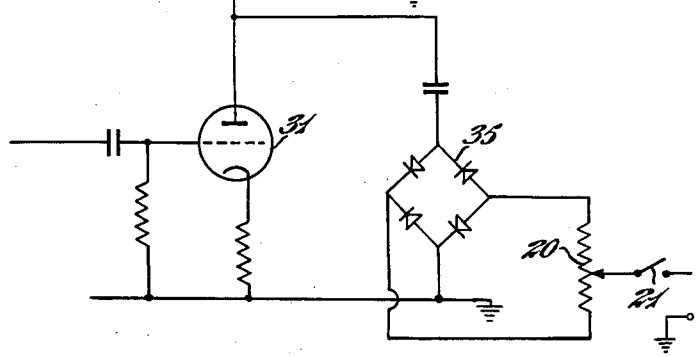
Inventor
Terence Kieran Phelan
By Stevens Davis Miller & Mosher
attorneys

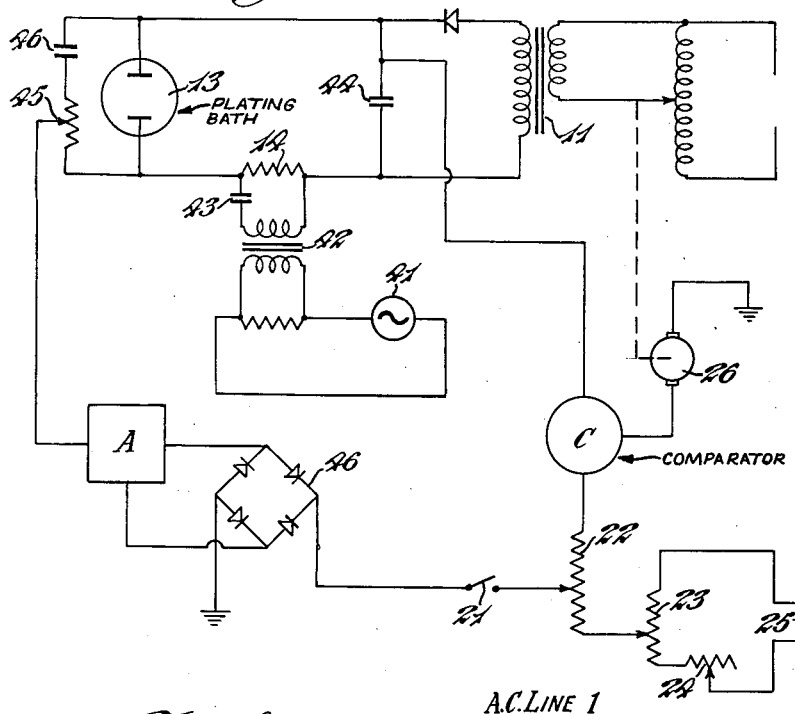
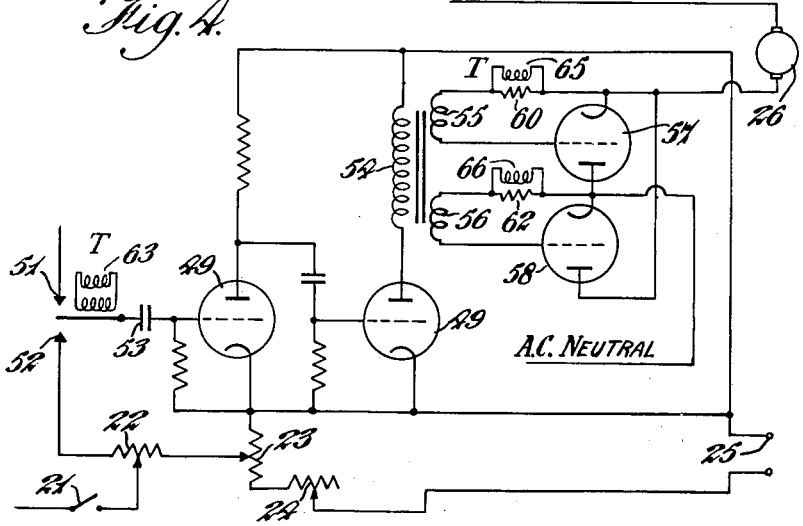

United States Patent Office 3,063,929
Patented Nov. 13, 1962

1

3,063,929
ELECTRICAL CONTROL DEVICE FOR
ELECTROLYTIC CELLS
Terence Kieran Phelan, St. Mary Cray, Kent, England,
assignor to Howard Wall Limited, London, England
Filed Feb. 6, 1959, Ser. No. 791,764
Claims priority, application Great Britain Feb. 12, 1958
6 Claims. (Cl. 204—228)

This invention relates to electrical control devices and is more particularly concerned with a device for automatically adjusting the voltage across an electroplating, electro-polishing, anodizing or like bath so that the current through the bath is maintained at an optimum value.

It is well known that, in electroplating baths, there exists an optimum current density, which depends on various factors including the temperature of operation, the material being plated, the constituents and concentration of the electro-plating solution, and the physical arrangement of the workpieces in the bath. Below this optimum current density, the plating does not take place as quickly as desired, and above this optimum density, undesirable phenomena such as "burning," poor throwing-power, and rough or powdery deposition occur.

It will be appreciated that, if electro-plating baths obeyed Ohm's law, increasing the surface area being plated would result in a corresponding decrease in the resistance and therefore, by maintaining a constant potential difnference across the bath, the current density could also be kept constant as workpieces were put into and taken out of the bath. However, electro-plating baths do not in general obey Ohm's except when the potential difference across them is below a given "threshold" value, and it is in practice necessary to increase the potential difference to keep the current density constant.

It has been suggested that the current through a standard area in the bath might be maintained at a constant value by means of an electrical comparator circuit, which circuit would be used to compare the current density with a constant current through the standard area and thereby operate a servo mechanism to keep the current density in a constant relationship with this standard. By this method, the current density may be maintained substantially constant as the surface area being electro-plated is increased by addition of further articles in the bath. However, when this method is used, the area increases as material is deposited on it and, therefore, the reading of the current density becomes inaccurate.

It has also been suggested that a rising characteristic for the voltage across the bath could be obtained automatically by maintaining the potential difference V across the bath and current I through the bath in the relation $$V = mI + c$$

where $m$ and $c$ are constants, but this assumes that the rising characteristic of V with I is a straight line, which is not strictly true.

Moreover, attempts to maintain the current density substantially constant, whether by automatic means (such as the servo mechanism referred to above) or by continuous manual operation of external reistance or the like in the bath circuit does not take into account the fact that the optimum current density depends on the nature of the work being plated and that, in large automatic

2 baths, variations in conditions in the bath, such as the local concentration of the solution, the temperature, and the ratio between the areas of the anode and cathode are likely to occur as the plating proceeds. Anode area variation occurs particularly during high-speed plating.

It has now been discovered that the effect of the varying conditions referred to above has a direct bearing on cathode polarization, and that the optimum current density can be maintained by varying the potential difference across the bath as a function of the apparent resistance of the bath as determined from the potential difference across and the current through the bath. The present invention is concerned with a method of and apparatus for effecting such variation automatically.

In accordance with the invention, there is provided a method of electrolytically treating the surface of an article in a bath of electrolyte, that comprises comparing, by means of a comparator circuit, a function of the voltage across and current through the bath with a function of the voltage across the bath, and operating a servo mechanism by means of the comparator circuit so that the voltage across the bath is varied in such a manner that the difference between the two functions is substantially constant. By this method it has been found that the current density may be maintained close to the optimum value required for electro-plating, electro-polishing, anodizing and like operations.

The invention also provides apparatus for varying the potential difference across the terminals of an electro-plating or like bath, which apparatus comprises a means for varying the potential difference applied across the bath, an electrical device adapted to give a potential difference proportional to the resistance of the bath, means for applying a potential difference proportional to the voltage across the bath and a potential difference proportional to the current through the bath as inputs to the said electrical device in such a manner that the output of the said electrical device will be proportional to the quotient of the two inputs, a comparator circuit adapted to compare the output of the said electrical device with a potential difference proportional to the potential difference across the bath, and a servo mechanism operated by the comparator circuit, the servo mechanism being arranged to operate means for varying the potential difference across the bath in such a manner that the difference between the output of the electrical device and the potential difference proportional to that across the bath as measured by the comparator circuit is kept at a constant predetermined value.

It is desirable that the apparatus should be arranged in a manner such that the comparator circuit has applied to it on the one hand, a voltage equal to the sum of a standard pre-set voltage and a voltage proportional to the quotient of the potential difference across and current through the bath, and, on the other hand, a voltage proporotional to the bath voltage. The standard voltage should be pre-set before the electrolytic operation begins, and it is contemplated that the apparatus of the invention may be calibrated in such a manner that the presetting can be carried out by a relatively unskilled operator.

The appartus of the invention is preferably designed to work on a three-phase alternating current but it will be appreciated that by making a slight appropriate modification it can also be used on mono-phase alternating current or direct current. For simplicity of description, the drawings have been shown with reference to operation on mono-phase alternating current, but the nature of the modifications necessary to enable operation on direct current or poly-phase alternating current to be carried out will be readily apparent to those conversant with electrical engineering. A suitable form of apparatus of the invention uses a current transformer or a shunt and a conventional transformer to apply potential differences proportional to the current through and potential difference across the bath to a device of the type that gives an output that is, over a wide range, proportional to the quotient of the two signals applied to it, and the comparator circuit is arranged so that it gives a signal to the servo mechanism that is proportional to the difference between a first voltage that is the sum of a voltage proportional to the output of the said device and a predetermined voltage, and a second voltage that is proportional to the actual voltage across the bath, whereby the servo mechanism operates to vary the voltage across the bath in such a manner that the difference between the first and second voltages vanishes. A suitable device for giving an output that is a function of the quotient of the signals applied to it a 6AS6 pentode valve used in a D.C. circuit. This valve can also be used to give an output that is proportional to the difference in the signals applied to it, and it has been found in practice that, by choosing a suitable relationship between the actual signals applied to the 6AS6 valve and the current and voltage of the bath, a current density in the neighborhood of the optimum can also be obtained by connecting the valve in such a manner that its output is a function of the difference of the two inputs.

The comparator circuit and servo mechanism could be in the form of two balanced relays that, when the balance is upset, switch in a motor that operates the variable transformer in the bath circuit, so that the potential difference across the bath is varied.

Alternately, the sum of the output from the 6AS6 valve or other device and a constant predetermined voltage can be compared with a voltage proportional to that across the bath by means of additional triode valves, arranged to pass a current to the servo mechanism proportional to the difference between the two potential differences being compared. This method has the advantage dead-beat control of the motor can be realized and hunting thereby avoided.

An alternative method of obtaining a voltage approximately proportional to the resistance across the bath is by means of a triode valve. An unrectified alternating voltage proportional to the direct voltage across the bath is applied through a condenser to the grid of the valve, and an alternating voltage is thus developed across the secondary winding of a transformer in the anode circuit, to the primary of which is applied a unidirectional potential difference proportional to the current through the bath, which will vary the impedance of the transformer and by suitable choice of circuitry the alternating voltage across the secondary winding is approximately proportional to the quotient $$\frac{\text{Potential difference across bath}}{\text{Current through bath}}$$

which can be rectified and compared with a unidirectional voltage proportional to that across the bath.

An alternative method of measuring the resistance of the bath is by means of a constant-voltage high-frequency source of alternating current. Such a current may be passed through the bath, and the alternating potential difference across the bath will be a measure of the resistance of the bath. This current may be rectified and then, by suitable amplification, a voltage proportional to it can be compared with a voltage proportional to that across the bath. The high-frequency current does not interfere with the process being carried out in the bath and by use of suitable rectifiers and condensers will not be affected by the main D.C. circuit.

Using apparatus in accordance with FIG. 1 of the invention, the following results were obtained in an experimental bath in which nickel was electroplated onto brass, using a solution of nickel sulphate containing about 165 gm./litre of that salt (20 Baumé):

| Area being plated (square feet) | P.D. Across bath (Volts) | Current through Bath (Amperes) | Current Density (Amps./sq. ft.) |
|---|---|---|---|
| 1.5 | 2.5 | 31 | 20.6 |
| 2.5 | 2.81 | 48 | 19.2 |
| 3.5 | 2.9 | 72 | 20.6 |
| 4.5 | 3.2 | 89 | 19.8 |
| 5.5 | 3.4 | 113 | 20.5 |
| 7.5 | 3.4 | 157 | 20.9 |
| 8.5 | 3.42 | 165 | 19.4 |
| 9.5 | 3.51 | 183 | 19.3 |
| 10.5 | 3.6 | 212 | 20.2 |
| 12.0 | 3.8 | 235 | 19.6 |
| 12.5 | 3.85 | 255 | 20.4 |

It will be seen that the increase in voltage required is by no means regular but that the current density through the bath is maintained substantially constant, to within ±5%.

A preferred construction of apparatus in accordance with the invention will now be described with reference to the accompanying drawings, in which:

FIG. 1 shows a circuit for apparatus in accordance with the invention;

FIGS. 2 and 3 show certain modifications;

FIG. 4 shows a suitable comparator circuit.

In FIG. 1, a variable transformer 11 provides an alternating current to a rectifier bridge 12, which passes to a plating or like bath 13. A shunt 14 applies a potential difference, proportional to the bath current, to potentiometer 15, and a second potentiometer 16 has the bath voltage applied to it. Tappings from these potentiometers are connected to grids 1 and 3 of pentode valve 17, grid 2 of which is connected in conventional manner to a conventional source 18 of high tension and also through a resistance 19 to the anode of the valve. The anode output is developed across 19, and the required proportion of it is taken off through potentiometer 20 and a switch 21, to a tapping on potentiometer 22, to which is also applied a potential difference tapped off potentiometer 23 connected in series with a rheostat 24 and a standard source 25 of direct current. Rheostat 24 is to prevent the potential difference across potentiometer 23 from being brought down below that corresponding to the minimum bath voltage.

Potentiometer 22 is connected to a comparator circuit, denoted generally by C, which includes an amplifier. The voltage from the bath is also applied to C. The signal from C is applied to the armature of a servo motor 26 which operates the variable transformer 11. The field of servo motor 26 is supplied with a unidirectional current.

Switch 21, when open, will enable the set to work as a constant voltage unit, which is useful in certain applications.

Referring now to FIG. 2 of the drawings, there is shown a triode valve 31 whose anode is connected, through the secondary winding 32 of a transformer, to a conventional source of high tension. The primary 33 of this transformer is connected in parallel with a shunt 34, arranged in the part of the bath circuit that carries the direct current to the bath. It thus follows that across the control winding 33 is a unidirectional voltage proportional to the current through the bath. To the grid of the triode valve 31 is applied an alternating voltage which is tapped off the unrectified part of the bath circuit, this alternating voltage being proportional to the potential difference across the bath. The voltage from the bath line is condenser-and-resistance fed in conventional manner. The cathode of the valve 31 is shown earthed. By supplying an alternating voltage proportional to the potential difference across the bath to the grid of the valve 31, an alternating voltage is developed across the secondary winding 32, which is the anode load of the valve 31. Since control winding 33 receives a potential difference proportional to the current through the bath, the impedance of winding 32 is thus varied and can produce a current substantially proportional to the quotient $$\frac{\text{Potential difference across the bath}}{\text{Current through the bath}}$$

i.e. to the resistance of the bath. This current is supplied, through a condenser, to a rectifier bridge 35 which applies a unidirectional potential difference to the potentiometer 20, so that as the above quotient increases, the voltage across 20 decreases. The remainder of the circuit (not shown) is then the same as in FIG. 1.

Turning now to FIG. 3 of the drawing, a high frequency source of constant alternating voltage such as oscillator 41 feeds the circuit of the bath through a transformer 42. The secondary circuit of this transformer contains a condenser in order that the direct current passing through the bath shall not go through the transformer. The bath circuit is completed, so far as this high-frequency current is concerned, by a system of condensers denoted generally by 44 which are designed to give zero impedance to the source 41. A potentiometer 45 is placed across the bath, the potentiometer being in series with a condenser 46 to prevent the bath current from passing through potentiometer 45, and a tapping from potentiometer 45 is passed to an amplifying arrangement denoted generally by A. It will be seen that as the resistance of the bath increases, the potential difference across potentiometer 45 increases. Amplifying circuit A is therefore of the type that gives a decrease in output for an increase in input. The output of this amplifier is applied to a rectifier bridge 46 to give a direct voltage substantially proportional to the resistance of the bath and this passes through switch 21 to a comparator circuit in the manner set forth in the description of FIG. 1.

FIG. 4 shows a general arrangement of a suitable comparator circuit for use in accordance with the invention. Connections of this circuit with motor armature 26 and standard voltage supply 25 are shown in the figure. The two voltages being compared are applied to contacts 51, 52. Contact 51 receives the voltage proportional to the bath voltage and contact 52 receives the voltage proportional to the resistance of the bath plus a standard voltage obtained from 22, 23, 24 and 25 as in FIG. 1. Vibrator 53 is operated by an A.C. source 63, which is a secondary winding of a transformer T, so that these voltages are applied alternately, through an amplifying arrangement including triode valves 49, to the primary winding 54 of a transformer having secondaries 55, 56. It will thus be seen that, when the voltages applied to the contacts 51, 52 are equal no current will pass through 55 and 56. However, when the voltage applied to 51 differs from the voltage applied to 52, currents will be induced in these two secondary coils proportional to that difference. The phase of these currents will depend on which voltage is the greater. One end of the secondary winding 55 is connected to the grid of a triode valve 57, the other end of 55 is connected to the cathode of 57 through a resistance 60, across which is fed an A.C. bias voltage from another secondary winding 65 on transformer T and phased such that as the A.C. feeding the anode of 57 goes positive, the grid goes negative. The cathode of 57 is connected to the anode of a second triode valve 58 and, through the armature 26 of the servo motor, to the A.C. line 1 feeding the primary of transformer T. One end of the secondary winding of 56 is connected to the grid of triode valve 58 and the other end of this secondary winding is connected to the anode of 57, the cathode of 58 and to the A.C. neutral line. In this case, the connection is made through a bias resistance 62 to which is supplied A.C. from another secondary winding 66 on the transformer T. Valves 57, 58 thus act as controlled grid rectifiers, such that when the voltage applied to 51 is greater than that applied to 52, 57 will conduct, but not 58, and vice versa. The current passed by these valves will be proportional to the difference between the two voltages and is passed to the armature of the servo motor 26, whose field is supplied by a constant source of direct current, thereby causing the armature of the motor to rotate in a direction depending on which valve is conducting and at a speed depending on the strength of the signal applied to the valves.

I claim:

1. Control device for an electroplating bath comprising means for varying the potential difference across the terminals of the bath, an electrical device of the type that when two input potential differences are applied to it in an appropriate manner, gives an output that is a function of the quotient of the two inputs, means for applying a potential difference proportional to the voltage across the terminals of the bath and a potential difference proportional to the current through the bath as inputs to the said electrical device in such a manner that the output of the said electrical device will be proportional to the quotient of the two inputs, a comparator circuit constructed and arranged to compare the output of the said electrical device with a potential difference proportional to the potential difference across the terminals of the bath, and a servo mechanism operated by the comparator circuit, the servo mechanism being constructed and arranged to operate the means for varying the potential difference across the bath in such a manner that the difference between the output of the electrical device and said potential difference proportional to that across the bath as measured by the comparator circuit is kept at a constant predetermined value.

2. Control device according to claim 1, in which the comparator circuit comprises a vibrator, two transformers having a common primary, and two triode valves connected anode-to-cathode, the cathode and grid of one triode being connected across the secondary of one transformer, the cathode and grid of the other triode being connected across the secondary of the other transformer, and the servo mechanism comprising a motor whose armature is connected across the anodes and cathodes of the triode valves and whose field is supplied by a constant source of direct current.

3. Control device for an electroplating bath comprising means for varying the potential difference across the terminals of the bath, a servo motor controlling this means, a comparator circuit, a pentode valve connected in a D.C. circuit in such a manner that its output is proportional to the quotient of two inputs applied respectively to its grids, means adapted to apply to said pentode grids unidirectional inputs proportional to the voltage across the terminals of and current through the electroplating bath, a source of an accurately predeterminable unidirectional voltage, means for applying the sum of this last-mentioned voltage and the output of the pentode valve as one input to the comparator circuit, and means for applying a unidirectional voltage proportional to the voltage across the terminals of the bath as the other input to the comparator circuit, the comparator circuit being connected to the servo motor in such a manner that the output from the comparator circuit drives the servo motor in a direction that will cause the means for varying the potential difference across the bath to vary this potential difference in a direction such that the output of the comparator circuit is decreased.

4. Control device for an electroplating bath comprising control means for varying the potential difference across the terminals of the bath, a servo mechanism including a servo motor controlling this means, a circuit containing electrical means capable of giving an output that is a function of the bath resistance, and a comparator circuit constructed and arranged to compare the said output with a potential difference proportional to that across the bath, the output of the comparator circuit being connected to said servo motor and controlling, in operation, the servo mechanism and hence the potential difference across the terminals of the bath in such a manner that the difference between the output of the said electrical means and said potential difference proportional to that across the bath as measured by the comparator circuit is kept at a constant predetermined value.

5. Control device as claimed in claim 4, in which the comparator circuit comprises a vibrator, two transformers having a common primary, and two triode valves connected anode-to-cathode, the cathode and grid of one triode being connected across the secondary of one transformer, the cathode and grid of the other triode being connected across the secondary of the other transformer, and the servo mechanism comprising a motor whose armature is connected across the anodes and cathodes of the triode valves and whose field is supplied by a constant source of direct current.

6. Means for controlling the voltage applied to an electroplating bath in accordance with the resistance across the terminals of the bath comprising a source of supply voltage, means to connect said source to the bath terminals and including potential adjusting means, a servo mechanism including a servo motor operatively connected to said potential adjusting means, means adapted to be connected to the terminals of the bath developing an output signal in accordance with the resistance between the terminals of the bath, comparator means having first and second input circuits and operating to derive an output signal in accordance with the difference between signals applied to said first and second input circuits, means connecting said first-named output signal to said first input circuit, means to apply the voltage at the terminals of the bath to said second input circuit, and means connecting said last-named output signal to said servo motor to operate the servo motor in a direction and to a degree in accordance with the difference between the signals applied to said first and second comparator input circuits.

References Cited in the file of this patent

UNITED STATES PATENTS

| | | |
|---|---|---|
| 2,488,856 | Few | Nov. 22, 1949 |
| 2,584,816 | Sands | Feb. 5, 1952 |
| 2,757,137 | Petrovich et al. | July 31, 1956 |
| 2,820,004 | Rendel | Jan. 14, 1958 |